(12) United States Patent
Mott

(10) Patent No.: US 6,267,701 B1
(45) Date of Patent: Jul. 31, 2001

(54) SPROCKET FOR MULTIPLE AXIS PHASED CHAIN SYSTEMS

(75) Inventor: Philip J. Mott, Dryden, NY (US)

(73) Assignee: BorgWarner Inc., Troy, MI (US)

( * ) Notice: Subject to any disclaimer, the term of this patent is extended or adjusted under 35 U.S.C. 154(b) by 0 days.

(21) Appl. No.: 09/389,452

(22) Filed: Sep. 3, 1999

Related U.S. Application Data

(60) Provisional application No. 60/101,212, filed on Sep. 21, 1998.

(51) Int. Cl.[7] .................................................. F16H 55/30
(52) U.S. Cl. ............................ 474/164; 474/148; 474/210
(58) Field of Search ...................... 474/156, 157, 474/158, 159, 160, 161, 162, 163, 164, 165, 148, 210

(56) References Cited

U.S. PATENT DOCUMENTS

| | | |
|---|---|---|
| 3,495,468 | 2/1970 | Griffel . |
| 4,139,995 | 2/1979 | Lamarche . |
| 4,254,985 | 3/1981 | Kirschner . |
| 4,317,388 | 3/1982 | Wojcikowski . |
| 4,342,560 | 8/1982 | Ledvina et al. . |
| 4,758,210 | 7/1988 | Ledvina . |
| 5,308,289 | 5/1994 | Funahashi . |
| 5,357,915 | * 10/1994 | Yamamoto et al. . |
| 5,397,280 | 3/1995 | Skurka . |
| 5,427,580 | 6/1995 | Ledvina et al. . |
| 5,437,581 | 8/1995 | Ledvina . |
| 5,560,267 | 10/1996 | Todd et al. . |
| 5,579,665 | 12/1996 | Mott et al. . |
| 5,619,887 | 4/1997 | Simpson . |
| 5,655,416 | 8/1997 | Mott et al. . |
| 5,690,568 | 11/1997 | Watson . |
| 5,813,934 | 9/1998 | Patton . |
| 5,816,968 | 10/1998 | Watson . |
| 5,860,882 | 1/1999 | Petrilli et al. . |
| 6,109,227 | * 8/2000 | Mott . |

* cited by examiner

Primary Examiner—Mary Ann Green
(74) Attorney, Agent, or Firm—Sidley, Austin Brown & Wood; Greg Dziegielewski

(57) ABSTRACT

A chain and sprocket system includes a plurality of chains and phased or offset sprockets. Problems related to equalizing or sharing the load between the driven sprockets in a multiple axis, phased system are eliminated by providing sprockets that rotate independently of one another and having only one of those sprockets transmit load or power to the driven shaft.

14 Claims, 3 Drawing Sheets

(PRIOR ART)
FIG. 6
FIG. 7
PRIOR ART
FIG. 10
FIG. 8
FIG. 9
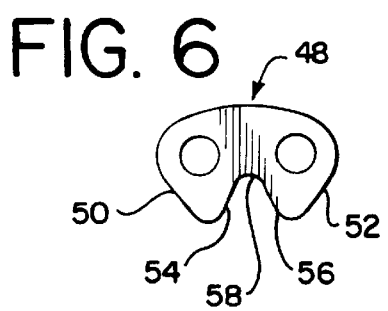
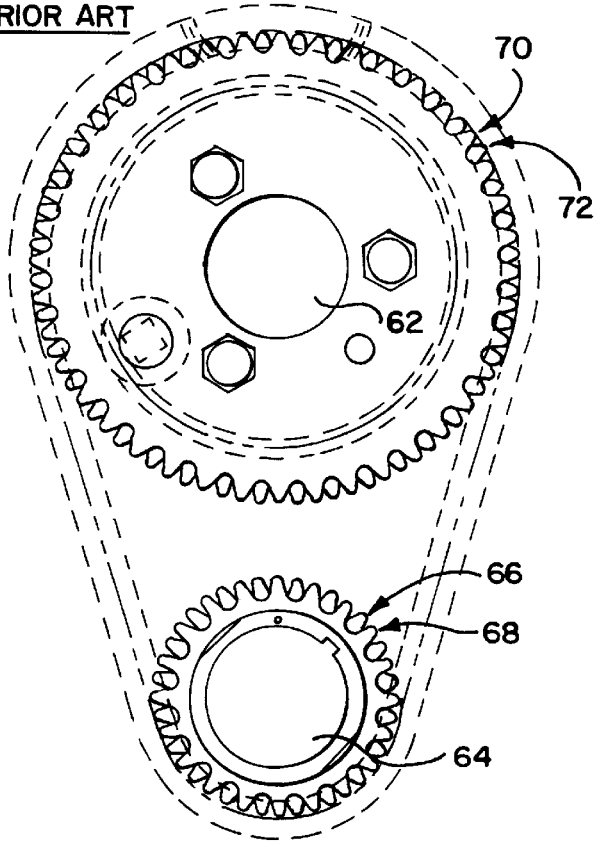
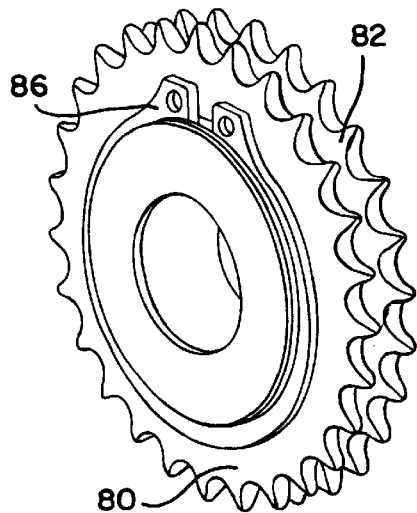
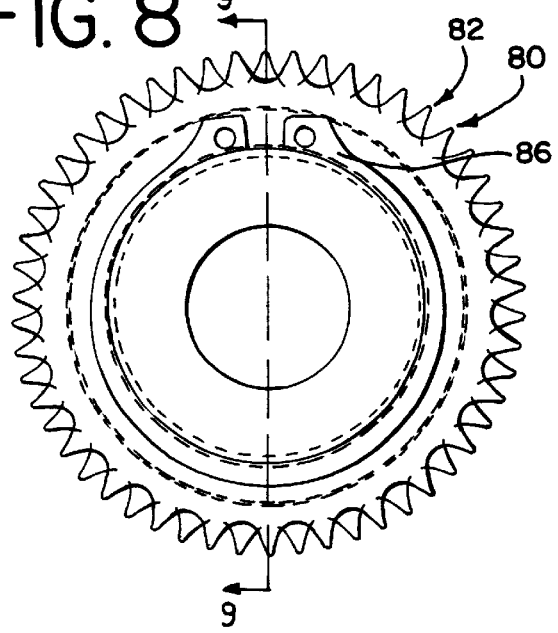
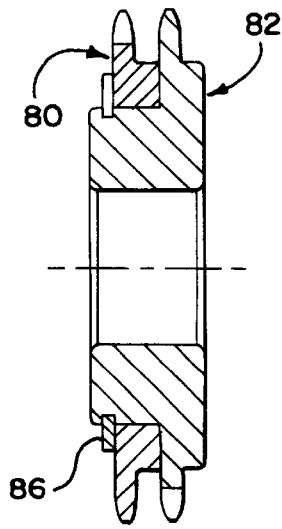

SPROCKET FOR MULTIPLE AXIS PHASED CHAIN SYSTEMS

This application claims benefit of provisional application U.S. Ser. No. 60/101,212, filed Sep. 21, 1998. Reference is made to U.S. Pat. No. 5,397,280, entitled "Phased Chain Assemblies," which relates to the subject matter of this application and is incorporated herein by reference.

BACKGROUND OF THE INVENTION

The present invention relates generally to power transmission chains. The invention has particular application to power transmission chains of the inverted tooth or silent chain variety, which are used in engine timing applications as well as in the transfer of power from a torque converter to a transmission or in a transfer case of a four-wheel drive vehicle.

The invention relates to phasing of the chain assemblies and the sprockets to modify the impact noise spectrum and chordal action noise spectrum. Specifically, the invention includes the use of timing chains in conjunction with phased sprockets to alter the noise spectra in an engine timing system. The invention also includes the use of random chains in conjunction with phased sprockets to alter the noise spectra.

Power transmission chains are widely used in the automotive industry. Such chains are used for engine timing devices as well as for the transfer of power from the torque converter to the transmission or for the transfer of power in a transfer case. Power transmission chains are also widely used in industrial applications.

One type of power transmission chain is referred to as "silent chain". Such chain is formed of interleaved sets of inverted tooth links. A set or rank of links is assembled from several links positioned alongside of or adjacent to each other. The links are connected by pivot means, which are typically round pins received in a pair of apertures. An example of silent chain is found in U.S. Pat. No. 4,342,560, which is incorporated herein by reference.

Conventional silent chains typically include both guide links and inverted tooth links. The guide links are positioned on the outside edges of alternate sets of links. The guide links typically act to position the chain laterally on the sprocket. Guide links typically do not mesh with the sprocket.

The inverted tooth links, or sprocket engaging links, provide the transfer of power between the chain and sprocket. Each inverted tooth link typically includes a pair of apertures and a pair of depending toes or teeth. Each toe is defined by an inside flank and an outside flank. The inside flanks are joined at a crotch. The inverted tooth links are typically designed so that the links contact the sprocket teeth to transfer power between the chain assembly and the sprocket. The inverted tooth links or driving links contact the sprocket teeth along their inside link flanks or their outside link flanks or combinations of both flanks. The contacts between the links and the sprocket teeth can be of the type which provide a power transfer, or can be of the nature of an incidental contact, or can include root contact or side contact.

A conventional silent chain drive is comprised of an endless silent chain wrapped about at least two sprockets supported by shafts. Rotation of a driving sprocket causes power transmission through the chain and consequent movement of a driven sprocket. In an engine timing drive application, the driving sprocket is mounted on the engine crankshaft and the driven sprocket mounted on the camshaft. The rotation of a camshaft is thus controlled by and dependent on the rotation of the crankshaft through the chain. A chain for an engine timing drive application is shown in U.S. Pat. No. 4,758,210, which is incorporated herein by reference.

A conventional chain drive may include a chain assembly of extended width in order to provide a chain of greater strength. Alternatively, two chain assemblies may be placed side-by-side between pairs of sprockets in order to achieve the equivalent power transmission results as a single extended width chain.

Engine timing systems conventionally include at least one driving sprocket located on the crankshaft and at least one driven sprocket located on the camshaft. Rotation of the crankshaft causes rotation of the camshaft through the chain and sprocket system.

The most basic conventional engine timing system typically includes a single sprocket on the crankshaft connected to a single sprocket on the camshaft, with the crankshaft sprocket having one-half the number of teeth of the camshaft sprocket. Such a camshaft typically controls the valve train operation through hydraulic lifters and rocker arms connected to the valve stems.

A more complicated engine timing system of the prior art connects the crankshaft with two overhead camshafts by a pair of chains. The crankshaft includes two sprockets. Each chain is connected to a single sprocket on each of the two overhead camshafts. Typically, the chain systems will include tensioners on the slack side of each chain to maintain chain tension and snubbers on the tight side of each chain to control chain movement during operation.

More complicated engine timing systems are also utilized in the prior art. Such systems include timing systems having two (or dual) overhead camshafts for each bank of cylinders. The dual camshafts on a single bank can both be rotated by connection to the same chain. Alternatively, the second camshaft can be rotated by an additional camshaft-to-camshaft chain drive. The cam-to-cam drive chain can also include single or dual tensioners for chain control. All of these structures are known in various forms in the prior art.

Conventional timing systems of the prior art can also include more complicated structures than a single sprocket on the crankshaft driving a single sprocket on a camshaft. Some systems include an idler sprocket between the crankshaft and camshaft. One chain system drives the idler which in turn drives either single or dual overhead camshafts. The sizing of the idler gear is such as to allow different rotational speeds of the crankshaft and camshaft. For example, the crankshaft may rotate twice the speed of the crankshaft by the sizing of the sprockets for the chain and sprocket drive system.

Noise is associated with chain drives. Noise is generated by a variety of sources, but in silent chain drives it can be caused, in part, by the impact sound generated by the collision of the chain and the sprocket at the onset of meshing. The loudness of the impact sound is affected by, among other things, the impact velocity between the chain and the sprocket and the mass of chain links contacting the sprocket at a particular moment or time increment.

The meshing impact sound is generally a periodic sound in chain drives. The impact sound is repeated with a frequency generally equal to that of the frequency of the chain meshing with the sprocket. The frequency is related to the number of teeth on the sprocket and the speed of the sprocket. The impact can produce sound having objectionable pure sonic tones.

Another cause of noise in chain drives is the chordal action of the chain and sprockets as the chain is driven about the sprockets. Chordal action occurs as the chain link enters the sprocket from the free chain. The meshing of the chain and sprocket at the chain mesh frequency can cause a movement of the free chain or span (the part of the chain between the sprockets) in a direction perpendicular to the chain travel but in the same plane as the chain and sprockets. This vibratory movement can also produce an objectionable pure sonic tone at the frequency of the chain mesh frequency or a derivative of it.

Many efforts have been made to decrease the noise level and pitch frequency distribution in chain drives of the silent chain variety to minimize the objectionable effects of the pure sonic tones. The present invention relates to those attempts to modify sound patterns by various phasing relationships between the chain assembly and the sprockets. Phasing the chain and sprocket relationship can reduce the number of chain link teeth (or mass of chain) impacting the sprocket during a given time increment. Similarly, phasing the chain and sprocket relationship can alter or phase the chordal action or articulation of the chain and sprocket.

Phased chain systems are described in U.S. Pat. No. 5,397,280, which is incorporated herein by reference. The phased chain systems described therein include phasing in engine timing drives.

As part of the phased chain and sprocket assembly, the present invention provides a modified sprocket construction. The modified sprocket is used with the phased chain assemblies to provide the phased chain and sprocket relationship.

SUMMARY OF THE INVENTION

The present invention relates to phased chain assemblies or systems. That is, transmission, transfer case or engine timing systems in which the sprockets are split into two portions or separate assemblies and the portions are offset or phased with respect to one another, with single or multiple chains.

The present invention is directed to providing a phased relationship between a pair of chain assemblies and a pair of sprockets in a chain system. The phasing is provided to modify the impact generated noise spectrum. The phasing of the present invention involves modifications to the sprocket construction, and the relationship between the positioning of the chain assemblies and sprockets.

In one embodiment of the present invention, the sprockets of an engine timing system are split into two portions and the portions are offset or phased with respect to one another. The engine timing system includes one driving sprocket located on the crankshaft and one driven sprocket located on the camshaft. Rotation of the crankshaft causes rotation of the camshaft thorough the chain and sprocket system.

In the present invention, an effort is made to match the load on the two chains in the phased system. As the difference in center distances between the two chains approaches zero, the load carried by each chain approaches an equal value. By matching the center distances, the load is more equally shared and each chain wears at approximately the same rate.

When phased chains are used on multiple axis systems, load sharing can be severely compromised. While the driving sprocket can include side-by-side phased sprockets with both sprockets sharing the load, the driven sprockets may or may not have equal load sharing across the two sprockets. Accordingly, the present invention utilizes a sprocket in which only one of the two sprockets drives each shaft. Since only a single driven sprocket is carrying load to the driven shaft, the load sharing issues are eliminated.

The sprocket of the present invention provides a pair of a side-by-side sprockets that are offset, or phased, by one-half pitch. However, only one of the two side-by-side sprockets is secured to the driven axis to provide a transmission of power. The remaining sprocket is independently rotatable from first sprocket and does not transmit power to the shaft. In other words, the remaining sprocket is in no way fixed or coupled to the shaft upon which it is mounted and is permitted to freewheel, imparting no drive to the shaft.

The sprocket of the present invention is particularly applicable to a phased engine balance system in which a single crankshaft is used to drive multiple balance shafts with a pair of phased chain assemblies. Each balance shaft has a pair of phased sprockets, only one of which transfers power to the shaft. Engine balancing systems using balance shafts require relatively low power to drive. While in terms of producing low noise it is still a benefit to drive each balance shaft with a pair of phased sprockets, the system does not need power to be transmitted to each shaft by both sprockets. Therefore, the low noise, phased chain and sprocket system of the present invention is used reducing or eliminating load sharing issues.

The sprocket of the present invention also finds application in a phased timing system in which a single crankshaft is used to drive multiple camshafts and an idler sprocket. The crankshaft may also be used to drive an auxiliary shaft, such as a shaft for an oil pump or other accessory drive. In this system, the driving sprockets on the crankshaft will be phased with both sprockets carrying power from the shaft to the sprockets to the chains. The driven sprockets, however, will have one or both sprockets carrying power from the chain to the sprockets to the shaft. The use of the single power carrying sprockets on the driven shafts eliminates the load sharing problem.

In each chain assembly, the links are interleaved to form sets of links. Each link includes a pair of apertures, with an aperture from one set of links being aligned for interlacing with an aperture from an adjacent set of links. Pivot means, in the form of round pins or rocker joints, are utilized to connect the adjacent sets of links through the apertures, and to allow pivoting of the sets of links with adjacent sets. Guide links are placed on alternating sets to maintain the alignment of the chain on the sprockets.

Use of silent chain assemblies and sprockets constructed in accordance with the teachings of the present invention is expected to result in the generation of noise patterns that are modified in comparison with the noise patterns generated by a chain and sprocket assembly that does not utilize phased chain and sprocket relationships. The chain assembly of this invention is suitable for use in a variety of types of chain assemblies and with a variety of sprocket tooth forms.

BRIEF DESCRIPTION OF THE DRAWINGS

For a more complete understanding of the invention, one should refer to the embodiments illustrated in greater detail in the accompanying drawings and described below by way of examples of the invention. In the drawings, which are not to scale:

FIG. 6 is a side view of a link of the prior art having curved inside flanks.

FIG. 7 is a schematic illustrating a phased timing chain system of the prior art with a single camshaft and single crankshaft.

FIG. 8 is a side view of a pair of phased sprockets of the present invention.

FIG. 9 is a sectional view along line 9—9 of FIG. 8.

FIG. 10 is a perspective view of a pair of phased sprockets of the present invention.

DETAILED DESCRIPTION OF THE PREFERRED EMBODIMENTS

Turning now to the drawings, the present invention is directed to providing phasing of chain assemblies and associated sprockets. The phasing is provided to modify the impact generated noise spectrum as well as the chordal action generated noise spectrum.

Figure 1:
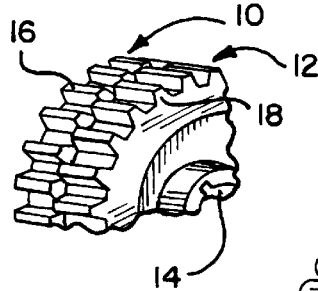
FIG. 1 is a perspective view of a pair of phased sprockets of the prior art.
Figure 2:
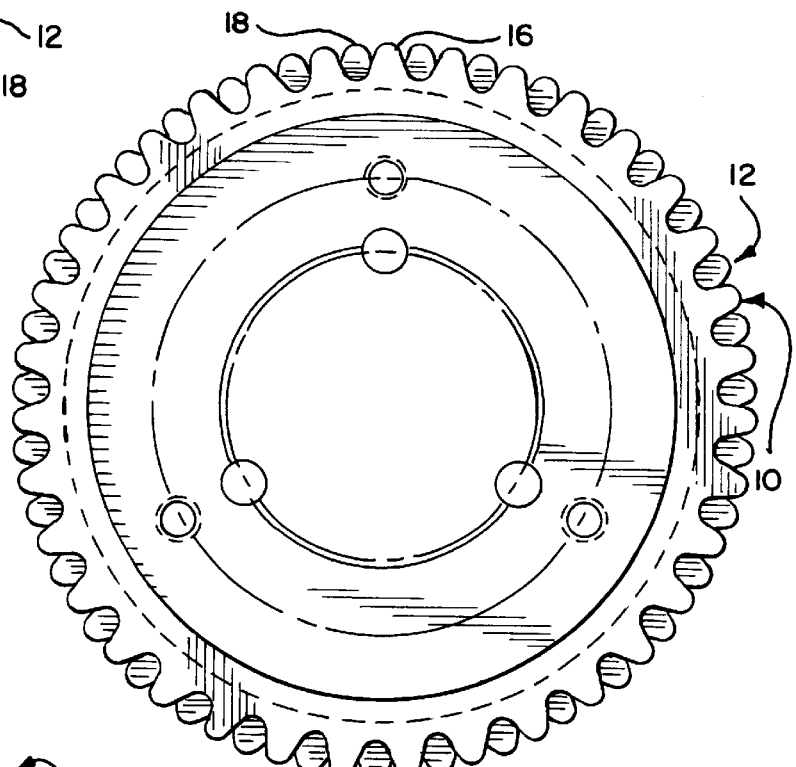
FIG. 2 is a side view of a pair of phased sprockets of the prior art that are phased by one-half pitch and the teeth offset.
Figure 3:
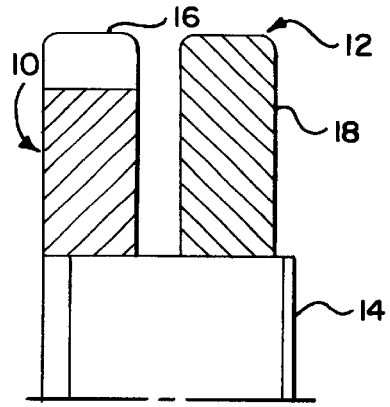
FIG. 3 is a sectional view of a pair of phased sprockets of the prior art in spaced apart position on a shaft.

A pair of conventional phased sprockets are shown in FIGS. 1, 2 and 3. The sprockets 10, 12 are positioned on the shaft 14 in side-by-side relationship, but are offset or phased by one-half sprocket tooth. Sprocket tooth 16, on sprocket 10, is one-half tooth offset from sprocket tooth 18, on adjacent sprocket 12.

Figure 4:
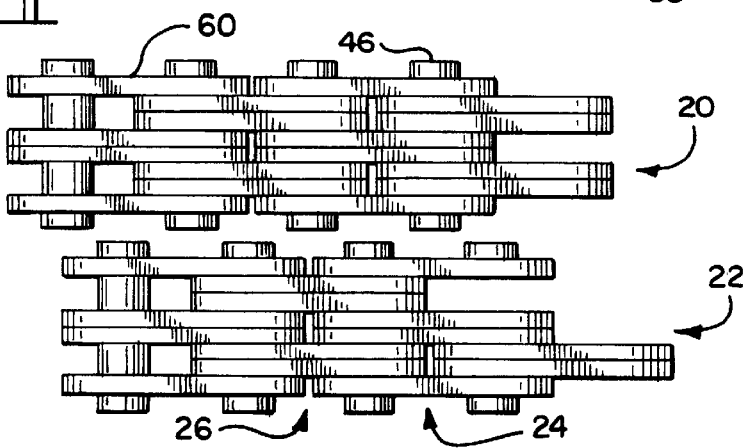
FIG. 4 is a top view of a pair of chains of the prior art that are phased or offset by one-half pitch.

The phased chains of the prior art are shown in FIG. 4. Each chain assembly or chain portion 20, 22 includes sets 24, 26 or ranks of links. A single set or row of links extends across the width of the chain and includes several interleaved links. The sets are then interleaved with adjacent sets to form the endless chain assembly.

Figure 5:
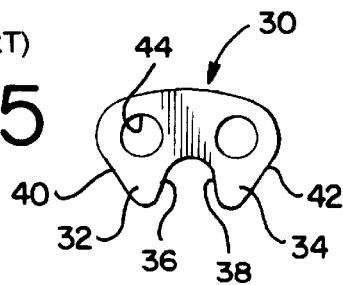
FIG. 5 is a side view of a link of the prior art having straight inside flanks.

Examples of links of the prior art are shown in FIGS. 5 and 6. The link 30 includes a pair of inverted or depending toes 32, 34. The toes includes inside flanks 36, 38 and outside flanks 40, 42. The link shown in FIG. 5 has generally straight inside and outside flanks. Each link includes a pair of apertures 44 for receiving pivot members or pins 46.

The link 48, shown in FIG. 6, includes generally straight outside flanks 50, 52, but curved or arcuate inside flanks 54, 56. The inside flanks are joined at a crotch 58, at the underside of the link.

The links are interleaved or joined by pins 46. Guide links 60 are press fit on the outsides of alternate rows of links. The guide links act to hold the chain on the sprocket and generally are not involved in power transmission.

The chain assembly is utilized to drive, for example, an engine timing assembly, such as shown in FIGS. 7 and 8, that include a camshaft 62 and crankshaft 64, or a transfer case for four-wheel drive vehicles. On the crankshaft are mounted a pair of phased sprockets 66, 68, and corresponding phased sprockets 70, 72 are mounted on the camshaft. The sprockets provide the means of power transfer between the chain and the two shafts.

The sprockets of the present invention are illustrated in FIGS. 8, 9 and 10. In those Figures, a pair of sprockets 80, 82 are placed in side-by-side but offset or phased relation. The sprockets 80, 82 of FIGS. 8–10 would replace sprocket 70, 72 in FIG. 7. One of the sprockets 82 is splined to the shaft, or connected to provide a power transmission between the sprocket and the shaft. The other sprocket 80 is held on the shaft by a spring clip 86. The spring clip holds the sprockets together, but does not provide a means of power transmission from the sprocket 80 to the shaft. Thus, the two sprockets rotate independently of one another.

The phased sprockets 80, 82 of the present invention are preferably used in multiple axis phased chain systems. In conventional phased chain systems, a pair of phased driving sprockets transmit power to a pair of chain from a driving shaft. The two chains then transmit power to a pair of phased driven sprockets, which are splined or otherwise connected for power transmission to the driven shaft. In such systems, the load carried by each of the two chains from the driving shaft to the driven shaft may not be equivalent. The load sharing, or division of amount of load between the two chains, is preferably as equal as possible in order to provide equivalent wear rates on the sprockets.

In multiple axis systems, such as when a crankshaft is driving multiple camshafts in an engine timing system, equalization of the load or equal load sharing is more difficult. Accordingly, the sprockets of the present invention eliminate the load sharing issues faced by the chain system by having only one of the phased sprockets carry load on the driven shaft. While the preferred implementation of this system involves use of the sprockets on the driven shaft, other utilizations within the scope of the present invention are possible.

Figure 11:
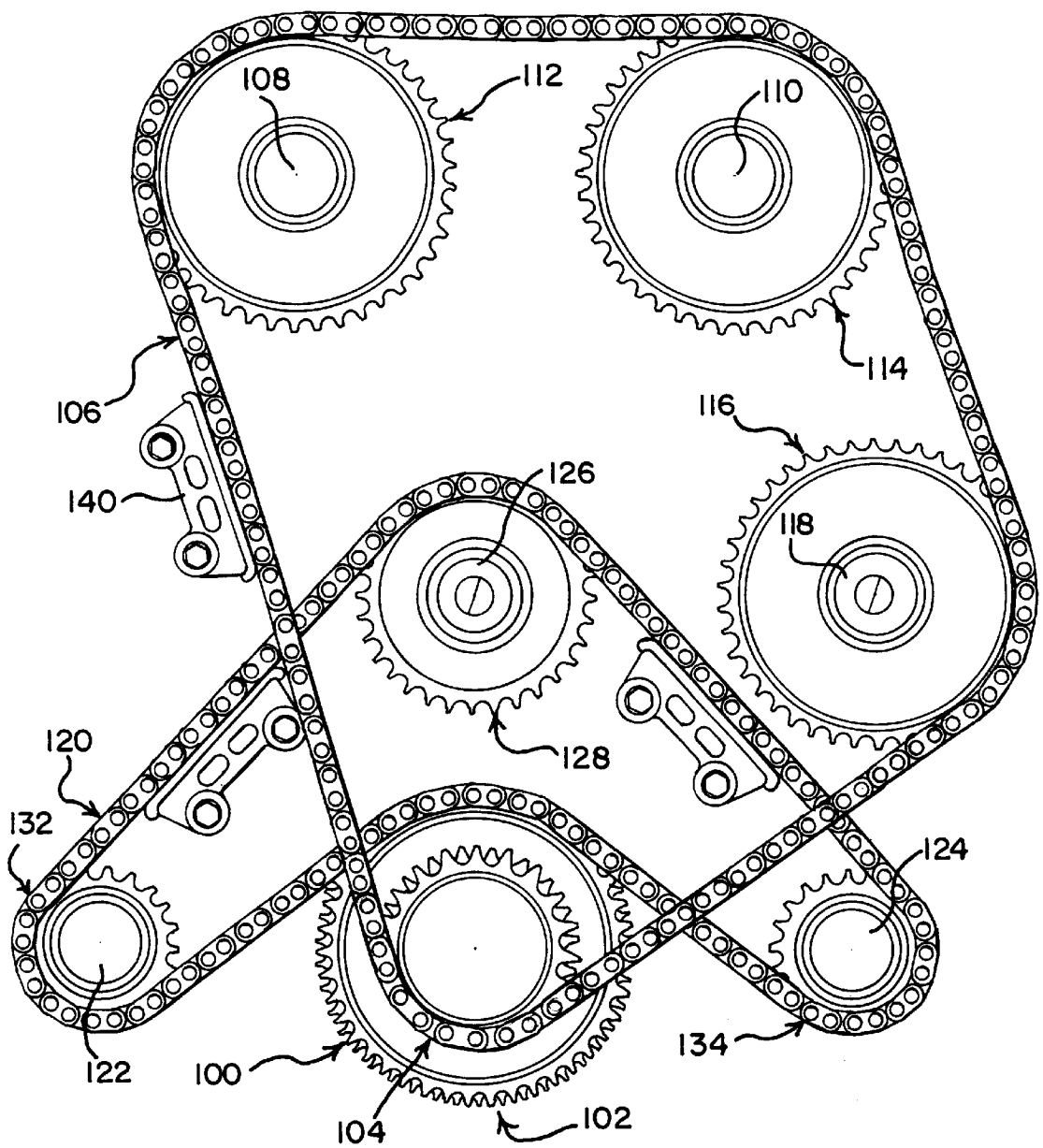
FIG. 11 is a schematic view of a multiple axis phased chain system that incorporates the phased sprockets of the present invention.

An example of a multiple axis timing chain system is illustrated in FIG. 11. It should be understood that, in FIG. 11, when a chain is depicted it is meant to have the form of a phased chain assembly like that shown in FIG. 4. Also, the sprockets depicted on the crankshaft are conventional phased sprockets and the sprockets mounted on both the camshafts and the balance shafts are meant to have the form of the present invention, as shown in FIGS. 8-10.

In FIG. 11 crankshaft 100 provides output through crankshaft sprocket pairs 102 and sprocket pairs 104. First crankshaft sprocket pair 104 includes a pair of phased sprockets. These two sprockets both carry load or transmit power to chain assemblies (or chain pairs) 106. The chain assemblies 106 provide the primary drive of the two overhead camshafts 108 and 110. Camshaft 108 includes a pair of phased sprockets 112 and camshaft 110 also includes a pair of phased sprockets 114.

The sprockets of the present invention may be used along one or both of the camshafts 108, 110. Thus, phased camshaft sprockets 112 may include sprockets that both transmit power to the camshaft, or may include only one sprocket that transmits power, such as the sprocket pairs of the present invention shown in FIGS. 8, 9 and 10. Similarly, phased camshaft sprockets 114 may include only one sprocket that transmits power to the camshaft, or both sprockets may transmit power to the camshaft.

The chain assemblies 106 also drive idler sprockets 116. Preferably, only one of these phased sprockets transmits load or power to the idler shaft 118. While only one sprocket transmits power, the pair of sprockets will be phased by one-half pitch in order that the system can take advantage of the noise reduction effects of phased chains. The intention of the present invention is to eliminate the load sharing issues with respect to the phased sprockets while still obtaining the benefits of phasing from a noise reduction standpoint.

The second crankshaft sprocket pair 102 provides power transmission through chain assemblies 120 to a pair of balance shafts 122, 124, and idler shaft 126 and optionally, to an accessory drive, such as an oil pump drive (not shown). Chain assemblies 120 are preferably phased by one-half pitch and transmit power from the phased crankshaft sprockets 102 to first balance shaft sprocket pair 132 and second balance shaft sprocket pair 134. Preferably, only one of the phased sprockets in each of sprocket pairs 132 and 134 will transmit power to each respective balance shaft, in accordance with the sprockets of the present invention. Similarly, preferably only one of the phased sprocket pairs in each of the sprocket pairs 128 on the idler shaft 126 and an optional accessory drive shaft (not shown) will transmit power to each respective shaft. The balance drive system shown is a preferred application of the present invention due to the low power requirements to drive each balance shaft. The balance shaft drive may also include conventional, or non-phased sprockets.

The chain assemblies of the multi-axis chain drive system shown in FIG. 11 utilize conventional snubbers 140 and tensioning devices to maintain tension and lateral control in various portions of the chain drive. Such devices are known to those skilled in the chain art.

In operation, as described, only one of the sprockets of the pairs of phased sprockets will transmit power to a designated driven shaft. Accordingly, the system will eliminate the need to balance or share the load between the two phased sprockets on those driven shafts.

While several embodiments of the invention are illustrated, it will be understood that the invention is not limited to these embodiments. Those skilled in the art to which the invention pertains may make modifications and other embodiments employing the principles of this invention, particularly upon considering the foregoing teachings.

What is claimed is:

1. A chain and sprocket drive system in an engine timing system with a balance shaft drive, said chain and sprocket drive system, comprising:

first and second crankshaft sprockets connected to an engine crankshaft, each of said crankshaft sprockets having a plurality of spaced teeth, said first and second crankshaft sprockets being disposed in parallel relationship along said engine crankshaft, the location of the teeth of said first crankshaft sprocket being offset with respect to the teeth of said second crankshaft sprocket, first and second balance shaft sprockets connected to a first engine balance shaft, said first and second balance shaft sprockets having a plurality of spaced teeth, said first and second balance shaft sprockets being disposed in parallel relationship along said first balance shaft, the location of the teeth of said first balance shaft sprocket teeth being offset with respect to the teeth of said second balance shaft sprocket, third and fourth balance shaft sprockets connected to a second engine balance shaft, said third and fourth balance shaft sprockets having a plurality of spaced teeth, said third and fourth balance shaft sprockets being disposed in parallel relationship along said second balance shaft, said first crankshaft sprocket being aligned with said first and third balance shaft sprockets and having a first timing chain assembly connecting said first and third balance shaft sprockets with said first crankshaft sprocket, said second crankshaft sprocket being aligned with said second and said fourth balance shaft sprockets and having a second timing chain assembly connecting said second and said fourth balance shaft sprockets with said second crankshaft sprocket, each of said first and said second chain assemblies having a plurality of interleaved sets of inverted tooth links, said links being adapted to contact the teeth of at least one of said sprockets, pivot pins connecting adjacent sets of links, each link defining apertures for receiving said pivot pins, said first and said second crankshaft sprockets being connected to said crankshaft to provide a power transmission therebetween, said first balance shaft sprocket being connected to said first balance shaft to provide a power transmission therebetween with said first chain assembly, said fourth balance shaft sprocket being connected to said second balance shaft to provide a power transmission therebetween with said second chain assembly, said second balance shaft sprocket rotating independently of said first balance shaft and said third balance shaft sprocket rotating independently of said second balance shaft.

2. The chain and sprocket drive system of claim 1 wherein said offset of said sprocket teeth is one-half sprocket tooth.

3. The chain and sprocket drive system of claim 1 further comprising a first idler shaft having a pair of idler sprockets, said first and second idler sprockets having a plurality of spaced teeth, said first and second idler sprockets being disposed in parallel relationship along said first idler shaft, the location of the teeth of said first idler sprocket being offset with respect to the teeth of said second idler sprocket, said first and said second chain assemblies contacting said first and said second idler sprockets to provide a power transmission therebetween, said first idler sprocket being connected to said first idler shaft to provide power transmission therebetween, said second idler sprocket rotating independently of said first idler shaft.

4. The chain and sprocket drive system of claim 3 wherein said second idler sprocket rotates independently of said first idler sprocket.

5. A chain and sprocket drive system in an engine timing system, comprising:

first and second crankshaft sprockets connected to an engine crankshaft, each of said crankshaft sprockets having a plurality of spaced teeth, said first and second crankshaft sprockets being disposed in parallel relationship along said engine crankshaft, the location of the teeth of said first crankshaft sprocket being offset with respect to the teeth of said second crankshaft sprocket, first and second camshaft sprockets connected to a first engine camshaft, said first and second camshaft sprockets having a plurality of spaced teeth, said first and second camshaft sprockets being disposed in parallel relationship along said first camshaft, the location of the teeth of said first camshaft sprocket teeth being offset with respect to the teeth of said second camshaft sprocket, third and fourth camshaft sprockets connected to a second engine camshaft, said third and fourth camshaft sprockets having a plurality of spaced teeth, said third and fourth camshaft sprockets being disposed in parallel relationship along said second camshaft, said first crankshaft sprocket being aligned with said first and third camshaft sprockets and having a first timing chain assembly connecting said first and third camshaft sprockets with said first crankshaft sprocket, said second crankshaft sprocket being aligned with said second and said fourth camshaft sprockets and having a second timing chain assembly connecting said second and said fourth camshaft sprockets with said second crankshaft sprocket, each of said first and said second chain assemblies having a plurality of interleaved sets of inverted tooth links, said links being adapted to contact the teeth of at least one of said sprockets, pivot pins connecting adjacent sets of links, each link defining apertures for receiving said pivot pins, said first and said second crankshaft sprockets being connected to said crankshaft to provide a power transmission therebetween, said first camshaft sprocket being connected to said first camshaft to provide a power transmission therebetween with said first chain assembly, said fourth camshaft sprocket being connected to said second camshaft to provide a power transmission therebetween with said second chain assembly, said second camshaft sprocket rotating independently of said first camshaft and said third camshaft sprocket rotating independently of said second camshaft.

6. The chain and sprocket drive system of claim 5 wherein said offset of said sprocket teeth is one-half sprocket tooth.

7. The chain and sprocket drive system of claim 5 further comprising a first idler shaft having a pair of idler sprockets, said first and second idler sprockets having a plurality of spaced teeth, said first and second idler sprockets being disposed in parallel relationship along said first idler shaft, the location of the teeth of said first idler sprocket being offset with respect to the teeth of said second idler sprocket, said first and said second chain assemblies contacting said first and said second idler sprockets to provide a power transmission therebetween, said first idler sprocket being connected to said first idler shaft to provide power transmission therebetween, said second idler sprocket rotating independently of said first idler shaft.

8. The chain and sprocket drive system of claim 7 wherein said second idler sprocket rotates independently of said first idler sprocket.

9. The chain and sprocket drive system of claim 5 further comprising:

third and fourth crankshaft sprockets connected to an engine crankshaft, each of said third and fourth crankshaft sprockets having a plurality of spaced teeth, said third and fourth crankshaft sprockets being disposed in parallel relationship along said engine crankshaft, the location of the teeth of said third crankshaft sprocket teeth being offset with respect to the teeth of said fourth crankshaft sprocket, first and second balance shaft sprockets connected to a first engine balance shaft, said first and second balance shaft sprockets having a plurality of spaced teeth, said first and second balance shaft sprockets being disposed in parallel relationship along said first balance shaft, the location of the teeth of said first balance shaft sprocket being offset with respect to the teeth of said second balance shaft sprocket, third and fourth balance shaft sprockets connected to a second engine balance shaft, said third and fourth balance shaft sprockets having a plurality of spaced teeth, said third and fourth balance shaft sprockets being disposed in parallel relationship along said second balance shaft, the location of the teeth of said third balance shaft sprocket being offset with respect to the teeth of said fourth balance shaft sprocket, said third crankshaft sprocket being aligned with said first and third balance shaft sprockets and having a third timing chain assembly connecting said third crankshaft sprocket with said first and said third balance shaft sprockets, said fourth crankshaft sprocket being aligned with said second and said fourth balance shaft sprockets and having a fourth timing chain assembly connecting said second and said fourth balance shaft sprockets with said fourth crankshaft sprocket, each of said third and said fourth chain assemblies having a plurality of interleaved sets of inverted tooth links, said links being adapted to contact the teeth of at least one of said sprockets, pivot pins connecting adjacent sets of links, each link defining apertures for receiving said pivot pins, said set of four crankshaft sprockets being connected to said crankshaft to provide a power transmission therebetween, said first balance shaft sprocket being connected to said first balance shaft to provide a power transmission therebetween, said fourth balance shaft sprocket being connected to said second balance shaft to provide a power transmission therebetween, said second balance shaft sprocket rotating independently of said first balance shaft and said third balance shaft sprocket rotating independently of said second balance shaft.

10. The chain and sprocket drive system of claim 9 wherein said offset of said sprocket teeth is one-half sprocket tooth.

11. The chain and sprocket drive system of claim 9 wherein said first and said second balance shaft sprockets are in a side-by-side and contacting relationship, said first balance shaft sprocket rotates independently of said second balance shaft sprocket.

12. The chain and sprocket drive system of claim 9 wherein said third and said fourth balance shaft sprockets are in a side-by-side and contacting relationship, said third balance shaft sprocket rotates independently of said fourth balance shaft sprocket.

13. The chain and sprocket drive system of claim 9 further comprising a second idler shaft having a pair of idler sprockets, said third and fourth idler sprockets of said second idler shaft having a plurality of spaced teeth, said third and fourth idler sprockets being disposed in parallel relationship along said second idler shaft, the location of the teeth of said third idler sprocket being offset with respect to the teeth of said fourth idler sprocket, said third and said fourth second chain assemblies contacting said third and said fourth idler sprockets to provide a power transmission therebetween, said third idler sprocket being connected to said second idler shaft to provide power transmission therebetween, said fourth idler sprocket rotating independently of said second idler shaft.

14. The chain and sprocket drive system of claim 13 wherein said fourth idler sprocket rotates independently of said third idler sprocket.

* * * * *